United States Patent [19]

Hoshiko

[11] Patent Number: 4,508,700

[45] Date of Patent: Apr. 2, 1985

[54] METHOD OF GENERATING OXYGEN FOR EMERGENCY USE

[75] Inventor: Yoshinori Hoshiko, Ueki, Japan

[73] Assignee: Hoshiko Medical Laboratories, Inc., Kamoto, Japan

[21] Appl. No.: 488,606

[22] Filed: Apr. 25, 1983

[30] Foreign Application Priority Data

Apr. 27, 1982 [JP] Japan ................................. 57-69678

[51] Int. Cl.³ .............................................. C01B 13/00
[52] U.S. Cl. ............................... 423/579; 252/186.28; 252/186.29; 252/186.41
[58] Field of Search ............... 423/579, 186.28, 186.29, 423/186.41

[56] References Cited

U.S. PATENT DOCUMENTS 969,073  8/1910  May ................................. 252/186.41

FOREIGN PATENT DOCUMENTS

| 584615 | 10/1959 | Canada | 423/579 |
| 15763 | 4/1971 | Japan | 423/579 |
| 160902 | 10/1982 | Japan | 423/579 |
| 783590 | 9/1957 | United Kingdom | 423/579 |
| 216654 | 7/1968 | U.S.S.R. | 423/579 |

*Primary Examiner*—John Doll
*Assistant Examiner*—Wayne A. Langel
*Attorney, Agent, or Firm*—Cushman, Darby & Cushman

[57] ABSTRACT

A method of generating oxygen for emergency use, wherein a mixture of solid material prepared by binding a catalyst such as the powder of manganese dioxide with a water-soluble binding agent such as a gum arabic solution and an addition compound of sodium carbonate and hydrogen peroxide is intermixed with water, so that the solid material is dissolved allowing the catalyst to gradually come into contact with a solution of hydrogen peroxide resulting from the decomposition of the addition compound of sodium carbonate and hydrogen peroxide, thereby generating oxygen gradually and continuously for an extended period of time.

6 Claims, 1 Drawing Figure

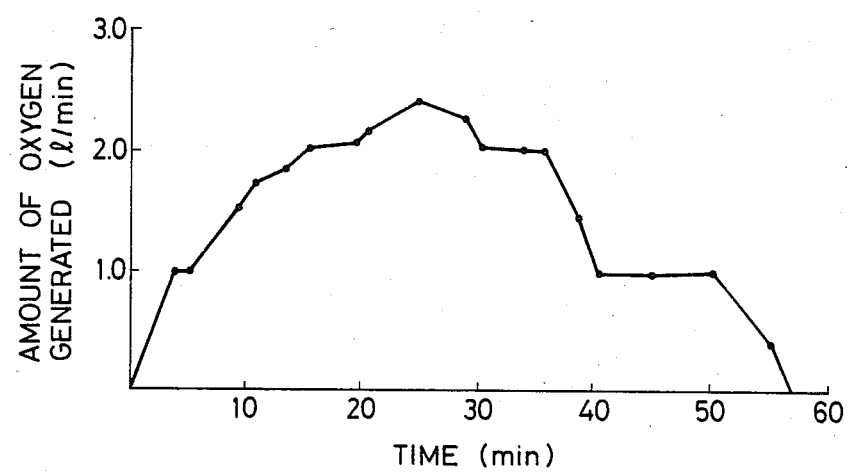

METHOD OF GENERATING OXYGEN FOR EMERGENCY USE

BACKGROUND OF THE PRESENT INVENTION (a) Field of the invention

The present invention relates to a method of generating oxygen for emergency use, wherein an additional compound of sodium carbonate and hydrogen peroxide ($2Na_2CO_3.3H_2O$) is employed.

(b) Description of the prior art

One's life is sometimes endangered by oxygen starvation at the time of escape from a fire. In such case, a supply of oxygen is needed. Besides, when poisonous gases are generated at the time of fire, it is necessary to wear a poisonous-gas absorbing mask which contains active carbon, for example, and at the same time, to get oxygen supplied. Thus, it is possible to escape danger. For this particular purpose, it is desired to have an oxygen generating means which is light in weight and handy to carry around and which can produce oxygen by simple operation. A handy oxygen generating means is also demanded in such case that oxygen inhalation is urgently needed when people get sick suddenly.

As an oxygen generating method applicable to such oxygen generating means, a method may be considered, wherein an addition compound of sodium carbonate and hydrogen peroxide is intermixed with water in the presence of a catalyst to generate oxygen. When 2 mols of the addition compound of sodium carbonate and hydrogen peroxide is intermixed with water in the presence of a catalyst, 48 g of oxygen is generated through a chemical reaction as shown by the following chemical reaction formula:

$$2Na_2CO_3.3H_2O_2 \rightarrow 2(Na_2CO_3.H_2O_2) + H_2O + 1.5O_2$$

This reaction takes place as follows: when the addition compound of sodium carbonate and hydrogen peroxide is intermixed with water, the addition compound is decomposed into sodium carbonate and a hydrogen peroxide solution. The hydrogen peroxide solution is then decomposed by the catalyst into water and oxygen. This reaction takes place drastically and moreover, causes the generation of heat. Consequently, depending on the amounts of water and catalyst used, the temperature instantaneously jumps to 100° C. causing bumping, while releasing oxygen and vapor simultaneously, to complete the reaction in a very short space of time. This is not desirable as an oxygen-supplying method for cases of accident and sudden illness in which a supply of oxygen is demanded continuously at a constant rate for a certain period of time.

Therefore, in order to generate from an addition compound of sodium carbonate and hydrogen peroxide of an amount that is conveniently carried around and usable in emergencies oxygen of an amount needed for emergency inhalation constantly for a predetermined length of time, it is necessary to check the drastic generation of oxygen and control the reaction so that oxygen is generated at a constant rate for a predetermined period of time. For this particular purpose, it is necessary to add water and a catalyst little by little and slowly thereby controlling the amounts of water and catalyst to be added, while observing the amount of oxygen being generated. In case of emergency, however, it is practically impossible to get a supply of oxygen while making such control.

SUMMARY OF THE PRESENT INVENTION

It is an object of the present invention to provide a method of generating oxygen for emergency use, wherein solid material is prepared by binding manganese dioxide or salts of metal such as iron, copper or lead to be used as a catalyst with any of a gum arabic solution, carboxymethylcellulose or starch, and a mixture of the solid material and an addition compound of sodium carbonate and hydrogen peroxide are intermixed with water, so that the solid material is dissolved gradually allowing the catalyst to come into contact with a hydrogen peroxide solution to gradually promote a chemical reaction, thereby generating oxygen at a constant rate for an extended period of time.

BRIEF DESCRIPTION OF THE DRAWING

The drawing is a graph showing relationship between the time elapsed and the amount of oxygen generated in the Example of the present invention.

DESCRIPTION OF THE EXAMPLE

The method of generating oxygen for emergency use according to the present invention is described below by way of Example.

TABLE

|  | Manganese dioxide | Gum arabic solution | Dissolving time |
| --- | --- | --- | --- |
| No. 1 | 30 g | 0.1% | 2–5 seconds |
| No. 2 | 45 g | 0.5 | 3–4 minutes |
| No. 3 | 50 g | 1.0 | 8–10 minutes |

As shown in Table, No. 1 solid matter was prepared by binding 30 g of manganese dioxide with a 15 cc gum arabic solution comprising water and 0.1% of gum arabic, No. 2 solid matter was prepared by binding 45 g of manganese dioxide with a 15 cc gum arabic solution comprising water and 0.5% of gum arabic, and No. 3 solid matter was prepared by binding 50 g of manganese dioxide with a 15 cc gum arabic solution comprising water and 1% of gum arabic. Of these three different kinds of solid matter, 3 g of No. 1 solid matter, 2 g of No. 2 solid matter and 1 g of No. 3 solid matter were mixed with an addition compound of sodium carbonate and hydrogen peroxide thereby forming a mixture. When said mixture and an adequate amount of water were intermixed, No. 1 solid matter dissolved in 2 to 5 seconds, generating a certain amount of oxygen. Then, No. 2 solid matter dissolved in 3 to 4 minutes, while No. 3 solid matter dissolved in 8 to 10 minutes. In this way the amount of solid matter increases as time passes after said mixture and water have been intermixed, increasing the amount of catalyst (manganese dioxide) involved in a chemical reaction. On the other hand, the amount of water resulting from the reaction increases, thereby decreasing the concentration of the hydrogen peroxide solution as the reaction progresses. Consequently, the reaction proceeds always at a substantially constant rate, always generating oxygen at a substantially constant rate.

The drawing is a graph showing relationship between the time elapsed and the amount of oxygen generated in the aforementioned Example. As is clear from this graph, the needed amount of oxygen starts generating continuously in 2 to 3 minutes for and then continues to be generated for about 50 minutes after the mixture and water have been intermixed.

In the above Example a gum arabic solution was employed to prepare solid material. In addition to the gum arabic solution, however, carboxymethylcellulose or starch is suitable for use as a binding agent to bind a catalyst.

As described by way of the above example, the method of generating oxygen according to the present invention can generate oxygen of an amount needed in case of emergency for an extended period of time (at least a period of time sufficient for people to escape danger in emergencies such as a fire or sudden illness). Further, the use of the method is simple enough for anyone to operate because what is required to do is just add an adequate amount of water to a previously-prepared mixture of sodium carbonate and hydrogen peroxide and solid material to decompose hydrogen peroxide. Further, the solid material can be prepared without difficulty at a low cost only in short period of time. The handling of solid material involves no difficulty, either.

I claim:

1. A method of generating oxygen for emergency use, comprising:
   (a) solidifying a hydrogen peroxide-binding catalyst in a series of differently-concentrated aqueous solutions of at least one effective binding agent for said catalyst; and
   (b) mixing therewith an addition compound of sodium bicarbonate and hydrogen peroxide, whereby, when a need for oxygen arises, water may be mixed therewith in order to cause a chemical reaction which generates oxygen more contiuously and constantly over an extended period of time than would be the case were said catalyst solidified in only one, uniformly concentrated aqueous solution of such binding agent.

2. The method of claim 1, wherein:
said binding agent is at least one member selected from the group consisting of gum arabic, carboxymethylecellulose and starch.

3. The method of claim 1, wherein:
said series of differently-concentrated aqueous solutions is constituted by three gum arabic solutions respectively containing 0.1 percent, 0.5 percent and 1.0 percent gum arabic.

4. The method of claim 3, wherein:
said catalyst is constituted by maganese dioxide.

5. The method of claim 4, comprising:
the subsequent step of mixing water with the mixture of said addition compound and said solidified series of differently concentrated aqueous solutions of binding agent and thereby causing a chemical reaction which generates oxygen more contiuously and constantly over an extended period of time than would be the case were said catalyst solidified in only one, uniformly concentrated aqueous solution of such binding agent.

6. The method of claim 1, comprising:
the subsequent step of mixing water with the mixture of said addition compound and said solidified series of differently concentrated aqueous solutions of binding agent and thereby causing a chemical reaction which generates oxygen more contiuously and constantly over an extended period of time than would be the case were said catalyst solidified in only one, uniformly concentrated aqueous solution of such binding agent.

* * * * *